July 16, 1968    STEN-ERIC SVENSSON    3,392,810
AUTOMATIC SLACK ADJUSTERS FOR VEHICLE BRAKE LINKAGES
Filed May 26, 1967

Inventor
Sten-Eric Svensson

By Lawrence R. Brown
Attorney

United States Patent Office 3,392,810
Patented July 16, 1968

3,392,810
AUTOMATIC SLACK ADJUSTERS FOR VEHICLE BRAKE LINKAGES
Sten-Eric Svensson, Malmo, Sweden, assignor to Svenska Aktiebolaget Bromsregulator, Malmo, Sweden, a corporation of Sweden
Filed May 26, 1967, Ser. No. 641,597
Claims priority, application Great Britain, May 27, 1966, 23,857/66
5 Claims. (Cl. 188—196)

ABSTRACT OF THE DISCLOSURE

Automatic slack adjusters for use in vehicle brake linkages constituting a housing as a lever rotatable about a shaft affixed to the vehicle body are provided with a simplified lost motion mechanism. Thus, a spring loaded slide member movable with the housing has a projection tooth extending into a notched arcuate recess in a ring affixed to the vehicle chassis. The slide member tooth thus freely moves with lost motion during the rotation of the housing within limits imposed by dimensions of the tooth and recess to produce the desired degree of lost motion over which the automatic slack adjustment mechanism is bypassed. Means is provided for variably adjusting the relative positions of the housing and shaft both automatically and manually.

---

This invention relates to automotive brake systems and, more particularly, to automatic slack adjusters for adjusting for variations in vehicle brake linkages.

Automatic slack adjusters of the prior art are exemplified by British Patents 1,025,398 and 1,025,399, published Apr. 6, 1966, for "Improvements in Automatic Slack Adjusters for Vehicle Brake Linkages." Such adjusters include a housing which constitutes a lever in a brake linkage which is rocked about the axis of a shaft. When the brake is applied or released, the housing is partially rotated about its axis with force being transmitted between the housing and the shaft by means of a worm gear mounted in the housing which meshes with a mating worm wheel affixed to the shaft. Slack in the linkage is adjusted by rotating the worm to alter the angular position of the worm wheel relative to the housing by means of a one-way clutch being connected through a lost motion connection to adjust the slack when it exceeds the nominal degree of lost motion.

In such prior art slack adjusters the lost motion connection has been complex and expensive requiring gear trains that require considerable mounting space and intricate working surfaces between various parts.

It is therefore an object of this invention to provide improved slack adjusters.

Another object of the invention is to simplify slack adjusters of the type described and to provide small external dimensions useful on conventional buses and trucks.

Still another object of the invention is to provide slack adjusters simpler to manufacture and more reliable in operation.

Thus, in accordance with the present invention, a slack adjuster is provided with worm driving means linking a rotatable housing to a fixed shaft, wherein rotation of the worm causes an angular positioning of the housing about the shaft. Thus, rotation of a worm gear shaft permits adjustment of a brake linkage coupled with the housing-shaft assembly as a lever in the linkage. Manual adjustment means for the gear shaft is provided as well as automatic adjustment means operable in response to a spring-loaded slide member with a projecting tooth coupled by a lost motion connection to a one-way clutch for rotating the worm gear shaft and take up slack whenever the linkage slack exceeds that defined by the lost motion connection. The lost motion linkage comprises a ring affixed to the vehicle chassis with an arcuate recess of appropriate dimension to set the desired degree of lost motion and into which the tooth on the slide mates.

The foregoing and further features of the invention are described hereinafter in detail with reference to the accompanying drawing of an embodiment of an automatic slack adjuster of this invention, wherein.

Figure 1:
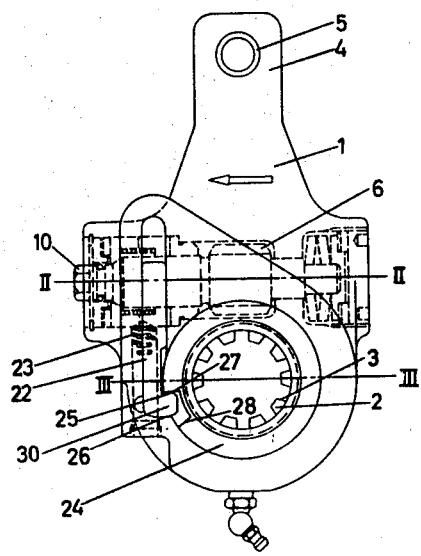
FIGURE 1 is a side view of a slack adjuster afforded by the invention in the condition when the brake is fully released, shown with a side cover plate removed to reveal the interior construction.

The illustrated slack adjuster comprises a housing 1 which constitutes a lever in a brake linkage of a vehicle where the vehicle parts are not shown. The housing 1 is mounted for rocking about the axis of a splined shaft (not shown) as indicated by the arrow. Worm wheel 2 is journaled in the housing 1 and mounted on and secured by means of splines 3 against rotation relative to the said shaft. The shaft may be considered fixed relative to housing 1 and is that which is conventionally provided with at least one cam for applying brake shoes to a brake drum in a brake system, but other linkages may be used to couple the housing to a braking mechanism.

The housing 1 is provided with a lever arm 4 having a hole 5 for connection to a piston rod (not shown) in a conventional cylinder-piston brake servo-unit, or the like.

The worm wheel 2 meshes with and is turned by a worm 6 made integral with an axially movable spindle 7 journaled in a bore 8 (FIGURE 2) in the housing 1 and in a bearing sleeve 9. One end portion 10 of the shaft 7 protrudes from the housing 1 and is shaped for engagement by a wrench when effecting manual adjustment. Rotation of the spindle 7 and worm 6 alters the relative angular positons of the housing 1 relative to the fixed shaft and the worm wheel 2 and thus alters the linkage travel necessary to establish contact between the brake shoes and the brake drum, i.e. the slack in the brake linkage.

The spindle 7 and the worm 6 are influenced by an axial force (towards the left in FIGURE 2) exerted by spring washers 11 clamped between a shoulder on the spindle 7 and a ring 12 abutting against a needle bearing 13 which in turn abuts against a cover 14 screwed into the housing 1.

Figure 2:
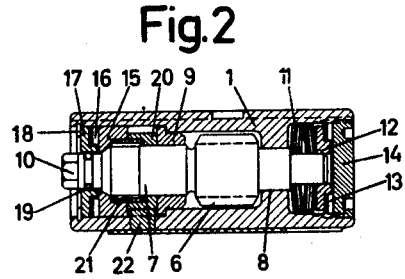
FIGURE 2 is a section view taken on line II—II of FIGURE 1.
Figure 3:
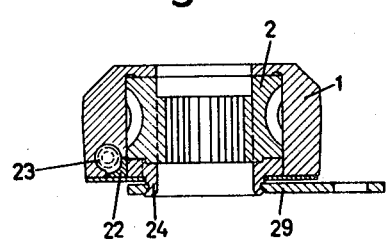
FIGURE 3 is a section view taken on line III—III of FIGURE 1.

The spindle 7 is prevented from making axial movements towards the left relative to the housing 1 beyond the position shown in FIGURE 2 by the engagement between a conical surface on the said spindle 7 and a clutch element 15 which bears against another needle bearing 16 which in turn abuts against a cover ring 17 secured in the housing 1 by a locking ring 18. The spindle 7 passes through an opening in the cover ring 17, and a gasket 19 prevents the entrance of dirt and escape of lubricant.

The clutch element 15 is provided with an interior cylindrical surface coaxial with an interior cylindrical surface of an adjacent gear wheel 20 journaled for rotation of the spindle 7. A helical coiled spring 21 having tight windings is arranged to engage the two interior cylindrical surfaces on the elements 15 and gear wheel 20, the windings having such direction as to form a one-way clutch transmitting rotational motion of the gear wheel 20 to the clutch element 15 only if the rotational motion has a direction such as to cause a slack-decreasing movement of the spindle 7 but allowing rotational motion of the gear wheel 20 in the opposite direction without transmitting the motion to the clutch element 15.

The gear wheel 20 engages a toothed rack on a slide member 22 arranged for limited motion in a groove in the housing 1. A helical coiled compression spring 23 abuts a shoulder in the housing 1 and a shoulder on the slide member 22, urging the linear slide member 22 downwards (as viewed in FIGURE 1). A single projection in the form of a tooth 30 projects from the slide member 22 into an arcuate recess in a ring 24 journaled in the housing 1 coaxially with the worm wheel 2. The tooth 30 has an upper convex surface 25 and a lower convex surface 26 to mate with the contact surfaces in the recess in the ring 24 which is partially bounded by two plane surfaces 27 and 28 each extending radially with respect to the axis of the ring 24 about which the housing 1 rocks.

The ring 24 is a stationary member, being held by means of a rigidly secured arm 29 which in turn is rigidly secured to a part of the chassis (not shown) of the vehicle.

The operation of the described device is as follows:

During the application of the brake the housing is turned in the direction shown by the arrow on the housing 1 in FIGURE 1. The ring 24 is stationary and the distance between the surfaces 27 and 25 will increase while the distance between the surfaces 26 and 28 will decrease. As soon as contact is obtained between the surfaces 26 and 28 the slide member 22 is moved upwardly relative to the housing 1 against the action of the spring 23. The gear wheel 20 is rotated, but its rotation is not transmitted to the clutch element 15 by the coiled spring 21. As soon as the transmitted braking force has reached such value that the axial force exerted on the spindle 7 through the worm 6 exceeds the force of the spring washers 11, the spindle 7 will be displaced relative to the housing 1 towards the right at viewed in FIGURE 2. Simultaneously the former contact between the conical surfaces on the clutch element 15 and the spindle 7 ceases to exist.

During the release of the brake the housing 1 is turned in the direction opposite that of the arrow on the housing 1 in FIGURE 1. As long as the axial force exerted on the spindle 7 through the worm 6 exceeds the force of the washers 11 the slide member 22 is moved downwards by the spring 23 and the surfaces 26 and 28 remain continuously in contact. The clutch element 15 is rotated during this movement of the slide member 22 but the rotation is not transmitted to the spindle 7 and the worm 6 until the brake force has decreased so much that the spring washers 11 have displaced the spindle 7 towards the left relative to the housing 1 as viewed in FIGURE 2. If such a decrease in the transmitted brake force does not occur until after the slide member 22 has reached its bottom position, no rotation of the worm 6 and no adjustment of the slack will be effected.

However, if the said conical surfaces on the spindle 7 and the clutch element 15 are engaged while the slide member 22 is still moving downwards, a reduction of the slack will be effected by a rotation of the worm 6 causing an angular displacement of the worm wheel 2 relative to the housing 1.

The line of contact between the surfaces 26 and 28 will move radially inwards and outwards during the braking and the brake-releasing operations.

In the condition when the brake is fully released, as shown in FIGURE 1, the housing 1 cannot be turned further in the direction opposite that of the arrow on the housing because the surfaces 25 and 27 are in contact and the slide member 22 is at the limit of its possible downward motion relative to the housing 1.

From the above description and the accompanying drawing it will be readily apparent that there is a very simple and compact lost-motion connection between the slide member 22 and the stationary ring 24 in the illustrated construction, but various modifications may be made without departing from the invention as defined in the appended claims. It is possible, for example, to arrange the projection on the stationary member and the recess in the slide member.

What is claimed is:

1. An automatic slack adjuster for a vehicle brake system comprising in combination, a housing having a lever arm connected in the brake linkage for rotation about a fixed shaft, means relatively adjusting the relative positions of the housing and shaft including worm gear means with a worm gear rotatable to vary the lever arm position, and automatic means driving said worm gear for automatically adjusting the slack in the brake linkage including a one-way clutch, a spring loaded linear slide, a stationary ring, mating projection and recess members in the slide and ring dimensioned to define a degree of free movement of the slide relative to said ring, and means coupling the slide to said worm gear through said clutch.

2. A slack adjuster according to claim 1, wherein the projection is in the form of a tooth projecting from the slide member and the recess is formed in the stationary member.

3. A slack adjuster according to claim 2, wherein the recess is partially bounded by at least one plane surface extending radially with respect to the said axis and the projection has a convex surface such that during the braking and brake releasing operations a line of contact between these plane and convex surfaces moves radially inwards and outwards.

4. A slack adjuster according to claim 2, wherein the ring is mounted on an axis coaxial with said fixed shaft and the recess is partially bounded by two plane surfaces each extending radially with respect to the said axis.

5. A slack adjuster according to claim 4, wherein the projection has two convex surfaces each of which can make linear contact with one of said plane surfaces.

References Cited

UNITED STATES PATENTS 3,121,478 2/1964 Bostwick.
3,351,164 11/1967 Svensson.
3,361,230 1/1968 Hildebrand et al.

DUANE A. REGER, *Primary Examiner.*